April 8, 1930.  S. HONEYWELL  1,754,168
VINE LIFTER
Filed Feb. 23, 1929
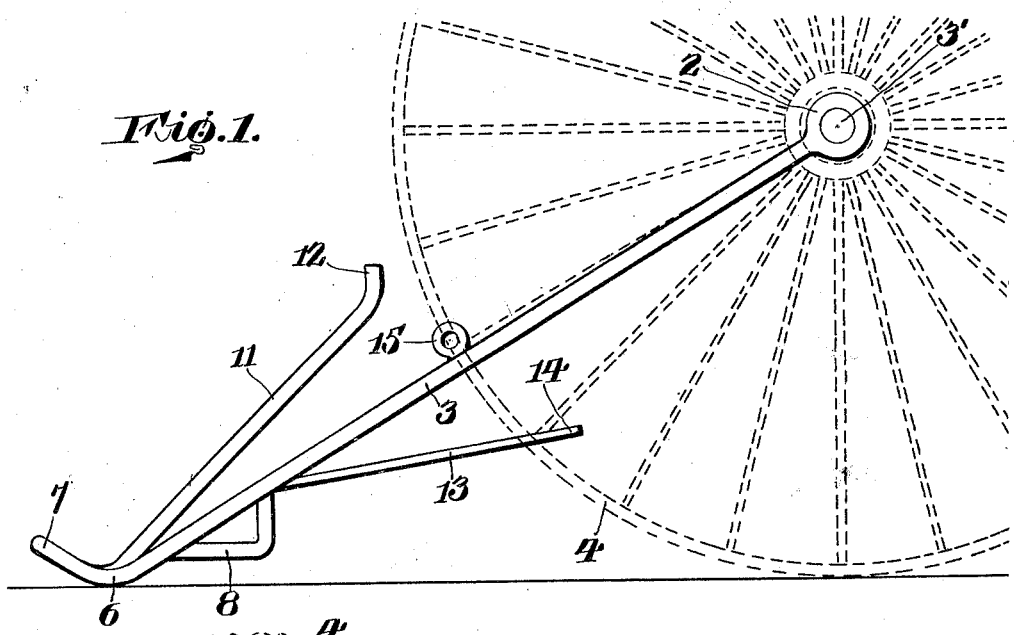
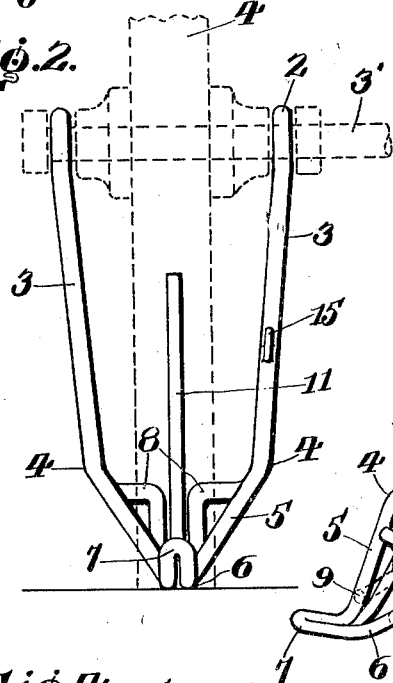
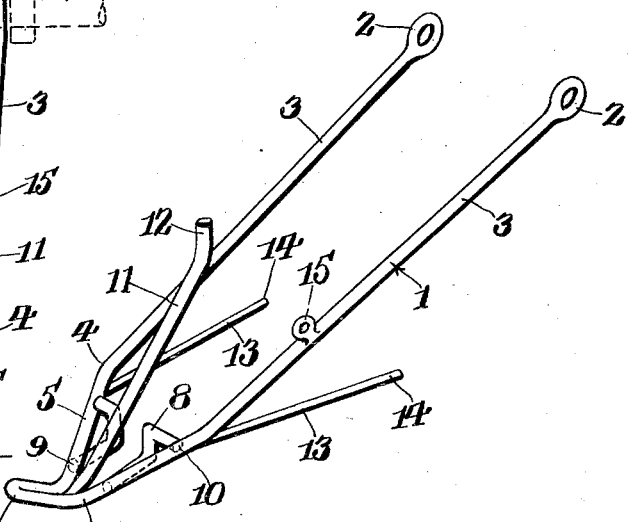
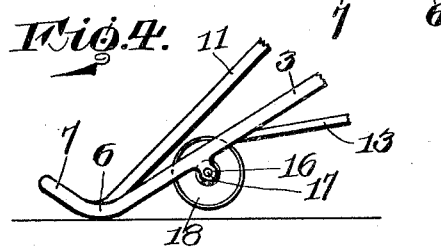
INVENTOR.
Stanley Honeywell,
BY
Geo. P. Kimmel
ATTORNEY.

Patented Apr. 8, 1930

1,754,168

UNITED STATES PATENT OFFICE

STANLEY HONEYWELL, OF ATWATER, OHIO

VINE LIFTER

Application filed February 23, 1929. Serial No. 342,166.

This invention relates to a vine lifter which is particularly adapted for attachment to a potato sprayer, but it is to be understood that the lifter may be used in connection with any appliance or implement which is found to be applicable for supporting and actuating the lifter while such appliance is being used for the purpose for which it was intended.

The primary object of the invention is to provide a vine lifter adapted for attachment to a potato sprayer as aforesaid, by means of which the vines or tops of the plants which have fallen or grown to a position between the rows of plants may be separated by rows and lifted out of the way of the wheels of the sprayer, thereby protecting the plants from the danger customarily incurred by the wheels of the sprayer running over the same.

A further object of the invention is to provide a vine lifter for the purpose aforesaid which is adapted to be attached to the axle, axle housing, or wheel hub of a potato sprayer, cultivator or the like, to project in front of the wheels of such sprayer or cultivator with a forward portion of the lifter sliding along the ground as the sprayer is advanced during its operation.

A further object of the invention is to provide a vine lifter for the purpose aforesaid, including as a part thereof a centrally disposed deflector for the relatively long vines which extend into the space between adjacent rows of plants, and a pair of spaced deflectors for the relatively short vines which extend into such space.

With the foregoing and other objects in view the invention consists in the novel construction, combination and arrangement of parts as hereinafter more particularly described and illustrated in the accompanying drawings, wherein is shown an embodiment of my invention, but it is to be understood that changes, variations and modifications may be resorted to which fall within the scope of the invention as claimed.

In the accompanying drawings in which like numerals are employed to designate like parts throughout the same:

Figure 1 is a side elevation of a vine lifter constructed in accordance with this invention, showing the same in operative position with respect to a sprayer.

Figure 2 is a front elevation of the embodiment illustrated in Figure 1.

Figure 3 is a perspective view of the vine lifter.

Figure 4 is a fragmentary, side elevation of a slightly modified form of my invention.

Referring to the drawings in detail the numeral 1 designates generally a substantially yoke-shaped supporting element which is formed at its bifurcated ends with a pair of eyes 2 for mounting the element on a mobile structure, and by way of example the eyes 2 are illustrated as mounted on the axle 3' of a vehicle such as a potato sprayer, with the wheels 4 of the vehicle being disposed between the eyes 2. Only one of the supporting elements 1 is illustrated but it is to be understood that one of such elements is to be provided for each wheel of the vehicle.

At the point 6 the portion 5 of the arms 3 merge into an apertured nose 7, the point of joinder between the portions 5 and nose 7 providing a heel for sliding contact with the ground. In the embodiment shown in Figures 1, 2 and 3, the portions 5 are provided with runners 8, the forward ends 9 of which are connected to the portions 5 in spaced relation to the heel 6. From their forward ends 9 the runners 8 extend rearwardly in horizontal, parallel relation and are angled upwardly and outwardly at their rearward ends for connection with the portions 5, as indicated at 10, in spaced relation to the angles 4.

Connected to the heel 6 at the longitudinal median thereof is a deflector element 11 which extends at an upward and rearward inclination at a greater angle to the ground than the angles between the arms 3 and the ground and terminates at its rearward end in an upturned portion 12 adjacent the wheel 4. Connected to the element 1 adjacent the angles 4 is a pair of deflector elements 13 which extend rearwardly at a slight upward inclination in the vertical plane of the arms 3 and terminate with their respective rearward ends 14 disposed on opposite sides of the wheel 4. One of the arms 3 is provided with an apertured lug 15 for connection with a hoisting apparatus not shown, by means of which the lifter may be removed from its operative position to aid in the movement of the vehicle and lifter from place to place and to permit the vehicle to be used if desired, independently of the lifter.

In operation, a forward movement of the vehicle to which the lifter is attached causes the heel 6 to slide along the ground directly in front of the wheel 4 which causes the nose 7 to pick up the ends of such vines as extend across the space between adjacent rows of plants. The forward motion of the lifter causes the vines thus picked up by the nose 7 to ride along the deflector 11 and thus be lifted out of the path of the wheel 4. Any vines which are too short to extend across the deflector 11 but which are long enough to extend across the path of the wheel are caught by the spaced deflectors 13 and are thereby prevented from falling within the path of the wheel.

In the operative movement of the apparatus across a field, the nose 7 is prevented from falling into any depressions in the ground which may be encountered by means of the runners 8, which support the element 1 during such time as the nose 7 may be over such depressions, thereby preventing the nose 7 from dropping to such an extent as to become obstructed by the wall of any such depression.

In the modification shown in Figure 4, the converging portions 5 of the arms 3 are provided with a pair of apertured ears 16 which depend from the portions 5 substantially at right angles. Mounted in the ears 16 and extending therebetween is an axle 17 upon which is mounted a wheel 18. The wheel 18 is normally maintained in spaced relation to the ground and is brought into rolling contact therewith when the heel 6 drops into any depression in the ground, thereby supporting the forward portion of the lifter until the heel is carried over such depression.

It is thought that the many advantages of a vine lifter in accordance with this invention will be readily apparent and although the preferred embodiment is as illustrated and described, yet it is to be understood that various changes in the details of construction may be resorted to without departing from the spirit of the invention or the scope of the appended claims.

What I claim is:

1. A vine lifter comprising, a supporting element adapted for connection with an axle of a vehicle and projecting forwardly of a wheel of the vehicle, said element being inclined downwardly to provide for a sliding contact with the ground adjacent the forward end of the element, a centrally disposed, rearwardly and upwardly extending deflector element for separating and lifting vines of adjacent rows simultaneously, a pair of spaced deflector elements disposed on opposite sides of said centrally disposed deflector element for removing the vines of adjacent rows respectively from the path of said wheel, and means carried by the supporting element adjacent its point of contact with the ground to provide a support for said supporting element when the forward end of the latter encounters a depression in the ground.

2. A vine lifter comprising, a supporting element adapted for connection with an axle of a vehicle and projecting forwardly of a wheel of the vehicle, said element being inclined downwardly to provide for a sliding contact with the ground adjacent the forward end of the element, a centrally disposed, rearwardly and upwardly extending deflector element for separating and lifting vines of adjacent rows simultaneously, a pair of spaced deflector elements disposed on opposite sides of said centrally disposed deflector element for removing the vines of adjacent rows respectively from the path of said wheel, and means to provide for the forward end of said supporting element passing over depressions in the ground.

3. A vine lifter comprising, a yoke-shaped supporting element adapted for connection with an axle of a vehicle and projecting forwardly of a wheel of the vehicle, said element being inclined downwardly and terminating in an upturned nose for lifting engagement with vines of adjacent rows of plants, the rearward portion of said nose providing a heel for sliding contact with the ground, a pair of runners carried by said element for supporting the same to permit said nose to pass over depressions in the ground, and means for separating said vines of adjacent rows and for removing them from the path of said wheel.

4. A vine lifter comprising, a supporting element adapted for connection with an axle of a vehicle and projecting forwardly of a wheel of the vehicle, said element being inclined downwardly and terminating in an upturned nose for lifting engagement with vines of adjacent rows of plants, the rearward portion of said nose providing a heel for sliding contact with the ground, means for separating said vines of adjacent rows and for removing them from the path of said wheel, and a pair of runners carried by said element and projecting rearwardly in spaced relation to the ground from a point adjacent said heel for supporting the supporting element when the heel drops into a depression in the ground to prevent said nose from being obstructed by the wall of the depression.

In testimony whereof, I affix my signature hereto.

STANLEY HONEYWELL.